(12) United States Patent
Olson

(10) Patent No.: US 10,947,904 B2
(45) Date of Patent: Mar. 16, 2021

(54) SEALING COOLING INNER FIXED STRUCTURE

(71) Applicant: Rohr, inc., Chula Vista, CA (US)

(72) Inventor: Timothy Olson, La Jolla, CA (US)

(73) Assignee: Rohr, Inc., Chula Vista, CA (US)

( * ) Notice: Subject to any disclaimer, the term of this patent is extended or adjusted under 35 U.S.C. 154(b) by 1153 days.

(21) Appl. No.: 15/372,052

(22) Filed: Dec. 7, 2016

(65) Prior Publication Data

US 2018/0156131 A1 Jun. 7, 2018

(51) Int. Cl.
*F02K 1/72* (2006.01)
*F02C 7/28* (2006.01)
*F02C 7/18* (2006.01)
*F02C 9/18* (2006.01)
*B64C 7/02* (2006.01)
*B64D 29/06* (2006.01)
*B64D 29/08* (2006.01)
*F02K 3/06* (2006.01)
*F02K 1/70* (2006.01)

(52) U.S. Cl.
CPC .............. *F02C 7/28* (2013.01); *B64C 7/02* (2013.01); *B64D 29/06* (2013.01); *B64D 29/08* (2013.01); *F02C 7/18* (2013.01); *F02C 9/18* (2013.01); *F02K 1/70* (2013.01); *F02K 3/06* (2013.01); *F05D 2220/323* (2013.01); *Y02T 50/60* (2013.01)

(58) Field of Classification Search
CPC ...... F02C 7/28; F02C 7/18; F02C 9/18; B64C 7/02; B64D 29/00; B64D 29/02; B64D 29/06; B64D 29/08; F02K 1/70; F02K 3/06; F05D 2220/323; Y02T 50/672; Y02T 50/675
See application file for complete search history.

(56) References Cited

U.S. PATENT DOCUMENTS

| | | | |
|---|---|---|---|
| 3,365,172 A | 1/1968 | McDonough | |
| 6,122,892 A * | 9/2000 | Gonidec | B32B 3/12 52/793.1 |
| 9,175,607 B2 | 11/2015 | Welch | |
| 9,670,874 B2 * | 6/2017 | Provost | F01D 11/005 |
| 2010/0044466 A1 * | 2/2010 | Vauchel | F01D 11/005 239/265.11 |
| 2014/0345199 A1 * | 11/2014 | Yahata | B64C 1/14 49/475.1 |
| 2015/0108247 A1 * | 4/2015 | Aten | F02K 1/763 239/265.19 |
| 2016/0290140 A1 * | 10/2016 | Thomas | F01D 11/08 |
| 2017/0284216 A1 * | 10/2017 | Khidekel | F01D 11/005 |

* cited by examiner

Primary Examiner — Gilbert Y Lee
(74) Attorney, Agent, or Firm — Snell & Wilmer L.L.P.

(57) ABSTRACT

An inner fixed structure (IFS) seal arrangement may comprise an IFS comprising an inner skin, and outer skin, and a cellular core located between the inner skin and the outer skin, an IFS seal, a seal retainer configured to retain the IFS seal, and a cooling flow channel disposed between the outer skin and the seal retainer.

17 Claims, 11 Drawing Sheets

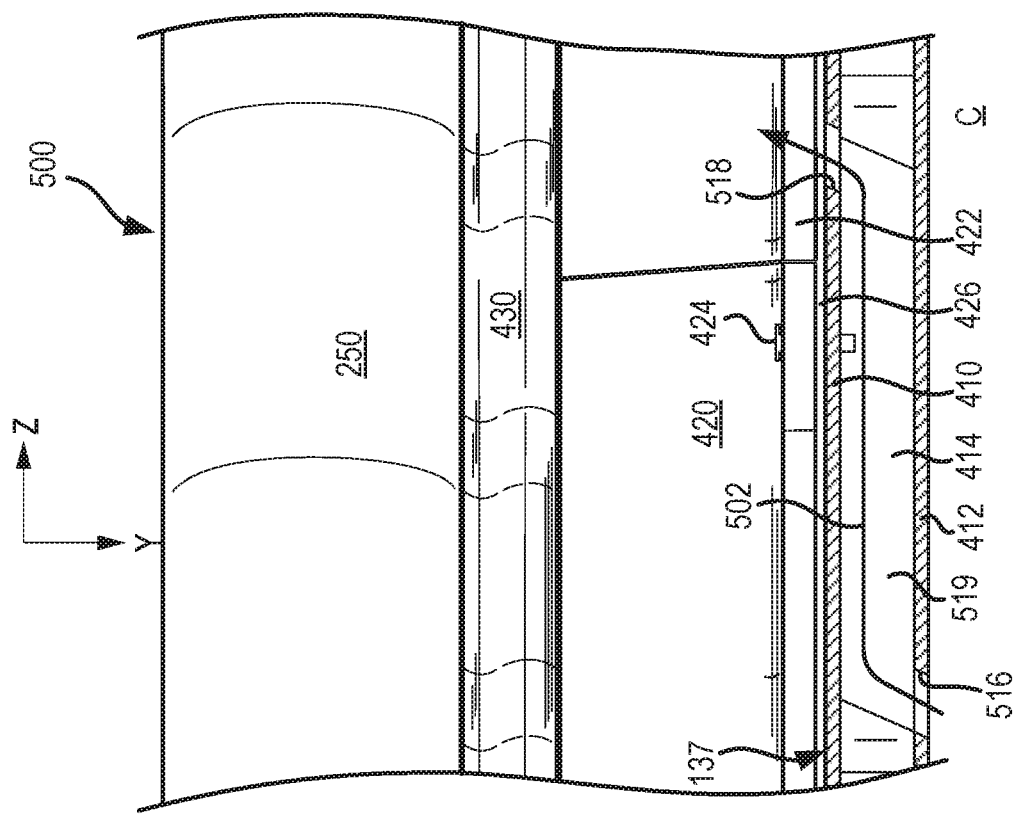
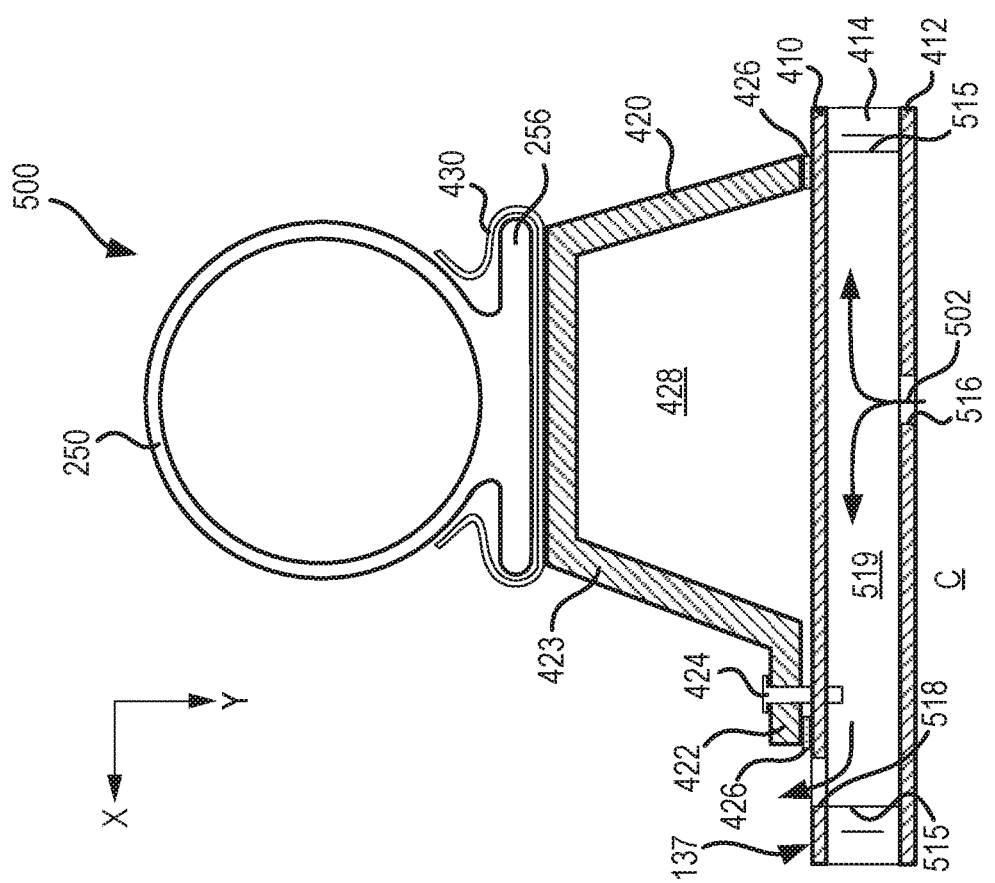

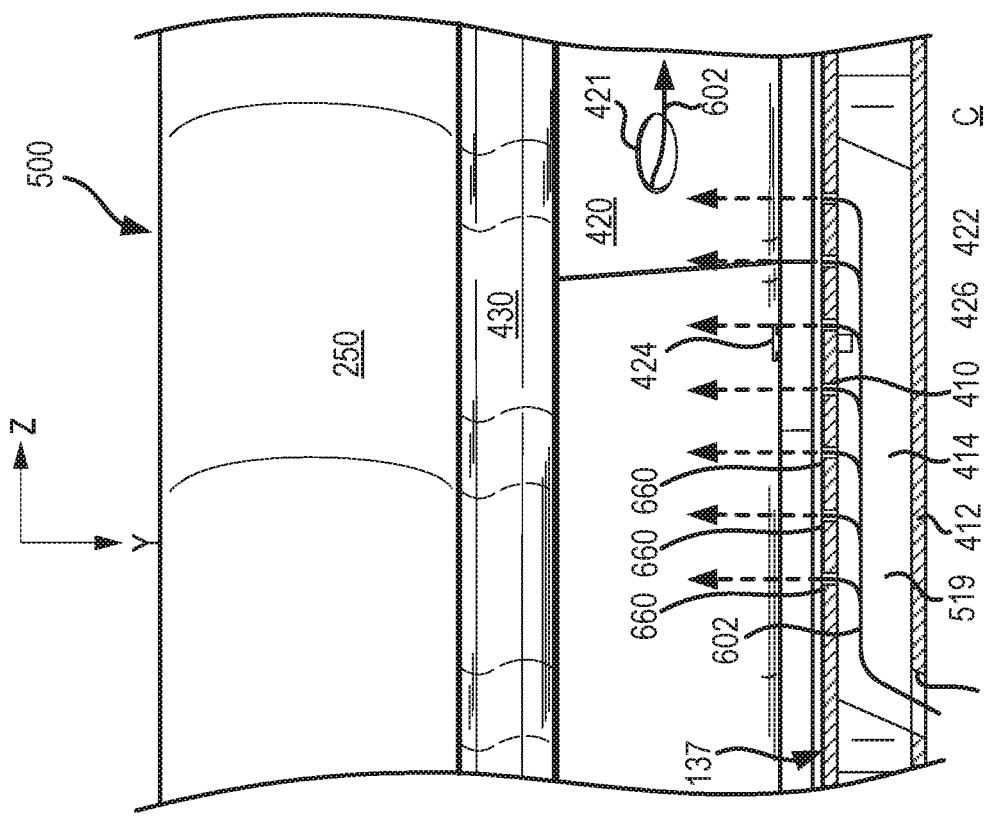
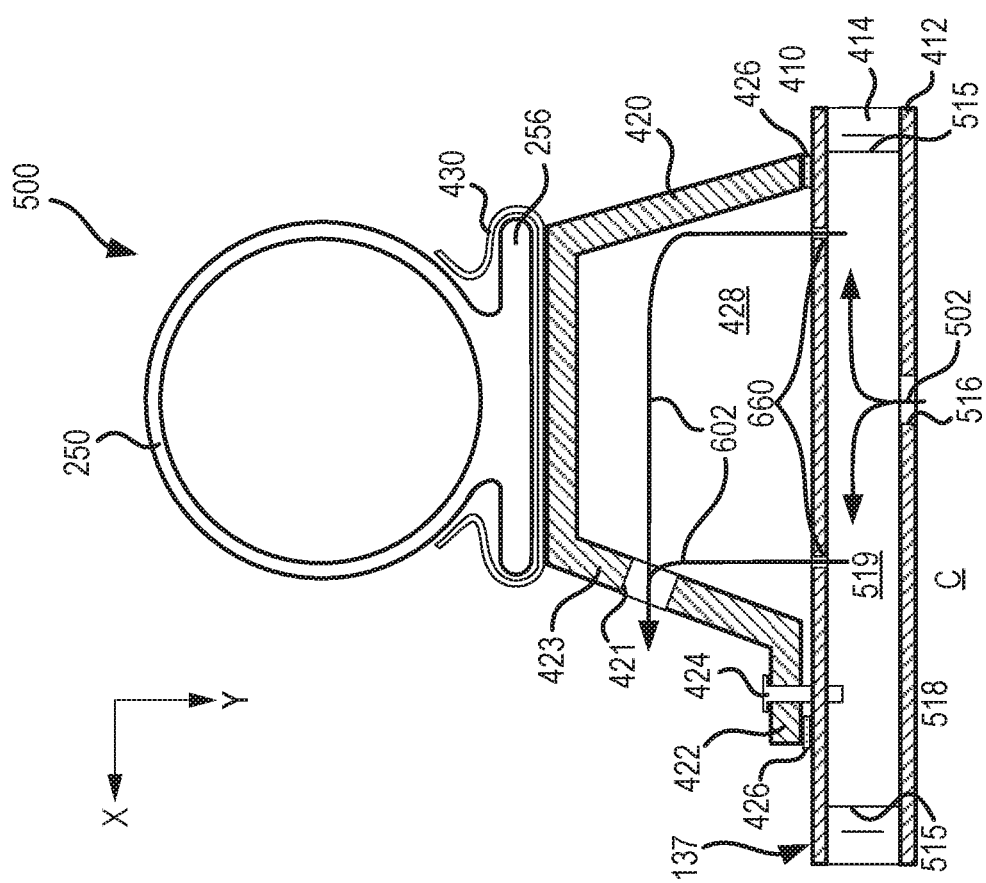

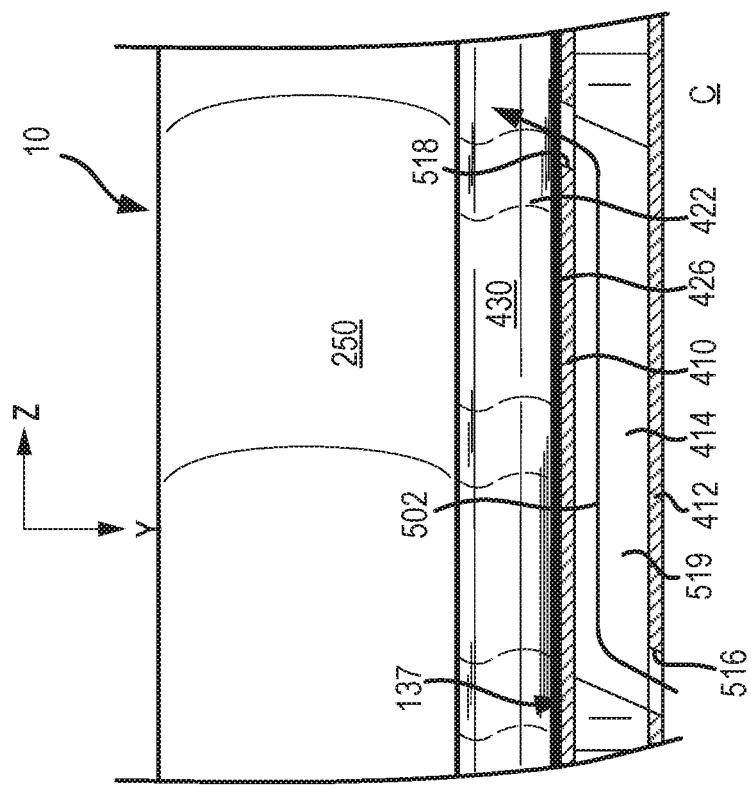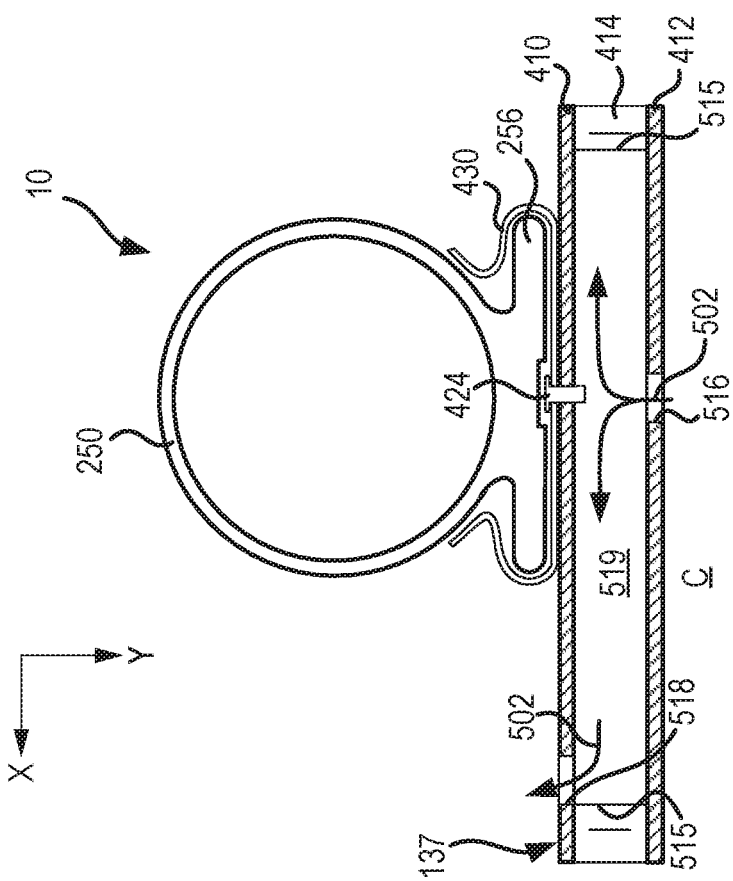

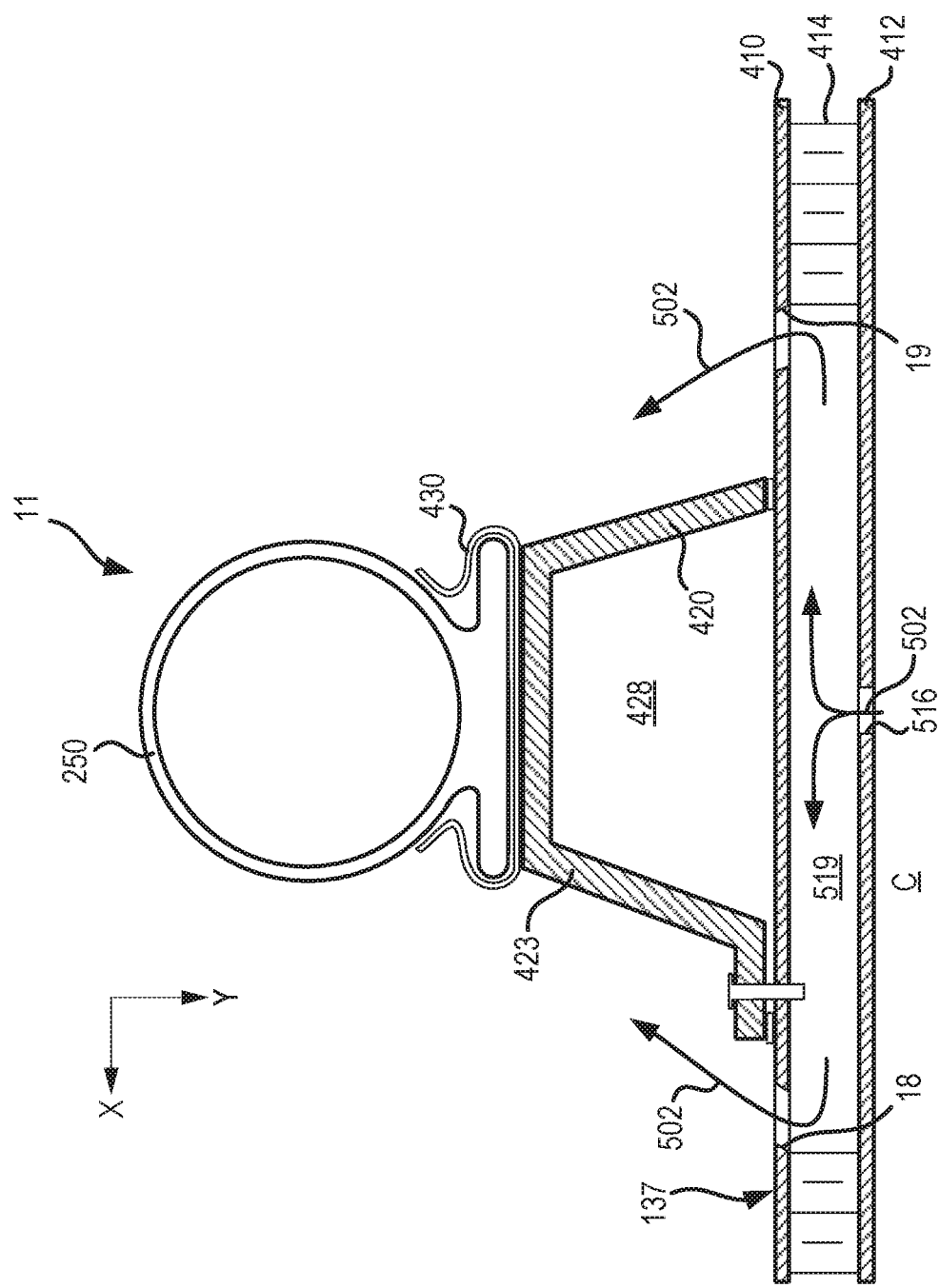

SEALING COOLING INNER FIXED STRUCTURE

FIELD

The present disclosure relates to aircraft engine nacelle seals, and more particularly to aircraft engine nacelle seals with cooling systems and methods.

BACKGROUND

A nacelle for a turbine engine typically includes an inlet section, a fan cowl section, a thrust reverser section, and an exhaust section. The nacelle is typically mounted to a wing or a fuselage of an aircraft via a pylon. The thrust reverser section is typically split into two halves comprising inner fixed structure (IFS) halves. An upper bifurcation fire seal may be disposed between each of the IFS halves and the pylon. Heat from the engine may impinge on the fire seal.

SUMMARY

An inner fixed structure (IFS) seal arrangement is disclosed herein, in accordance with various embodiments. An IFS seal arrangement may comprise an IFS comprising an inner skin, and outer skin, and a cellular core located between the inner skin and the outer skin, an IFS seal, a seal retainer configured to retain the IFS seal, and a cooling flow channel disposed between the outer skin and the seal retainer.

In various embodiments, the IFS seal may comprise an upper bifurcation seal configured to form a seal between a pylon and the IFS. The seal may comprise a fiber reinforced polymeric material. The IFS seal arrangement may further comprise a seal standoff configured to be coupled to the IFS. The seal retainer may be configured to be coupled to the seal standoff. The seal standoff may be configured to form a cavity between the seal standoff and the IFS and at least partially defines an outlet aperture whereby a flow of cooling air may exit the cavity. The seal standoff may be located between the IFS and the seal retainer, and the seal retainer may be located between the IFS seal and the seal standoff. The outlet aperture may be disposed in a sidewall of the seal standoff. The seal standoff may be configured to be located over an inlet aperture disposed in the IFS. The cavity may be configured to receive the flow of cooling air from a bypass flow path. The seal standoff may be configured to transfer heat from the seal standoff to the flow of cooling air. The inner skin, the outer skin, and the cellular core may define the cooling flow channel configured to receive a flow of cooling air from a bypass flow path via an inlet aperture disposed in the outer skin. The IFS may comprise an outlet aperture disposed in the outer skin for routing the flow of cooling air out of the cooling flow channel. The outlet aperture may be configured to direct the flow of cooling air towards at least one of the seal retainer or the IFS seal. The flow of cooling air may be configured to cool the IFS.

An inner fixed structure (IFS) seal arrangement is disclosed herein, in accordance with various embodiments. An IFS seal arrangement may comprise an IFS comprising an inner skin, and outer skin, and a cellular core located between the inner skin and the outer skin, a seal standoff configured to be coupled to the IFS, a seal retainer configured to be coupled to the seal standoff, an IFS seal configured to be coupled to the seal retainer, a cooling flow channel disposed in the IFS defined by the inner skin, the outer skin, and the cellular core, an inlet aperture disposed in the outer skin, a plurality of apertures disposed in the outer skin, and a cavity defined by the IFS and the seal standoff, wherein the cooling flow channel is configured to receive a flow of cooling air from a bypass flow path via the inlet aperture, and the cavity is configured to receive the flow of air via the plurality of apertures.

In various embodiments, the seal standoff may be located between the IFS and the seal retainer, and the seal retainer may be located between the IFS seal and the seal standoff. The IFS seal arrangement may further comprise an outlet aperture disposed in the outer skin for routing the flow of cooling air out of the cooling flow channel. The IFS seal arrangement may further comprise an outlet aperture at least partially defined by the seal standoff for routing the flow of cooling air out of the cavity.

A method of cooling a seal is disclosed herein, in accordance with various embodiments. A method of cooling a seal may comprise routing a flow of cooling air from a bypass flow path to a cooling flow channel, and removing heat from an inner fixed structure (IFS), wherein the IFS comprises an inner skin, and outer skin, and a cellular core located between the inner skin and the outer skin, and the cooling flow channel is disposed between the outer skin and a seal retainer, the seal retainer configured to retainer an IFS seal.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 5A and FIG. 5B illustrate a cross section view and a partial cross section side view, respectively, of a seal arrangement coupled directly over a cooling flow channel disposed in an IFS, in accordance with various embodiments;

FIG. 6A and FIG. 6B illustrate a cross section view and a partial cross section side view, respectively, of a seal arrangement with a plurality of apertures disposed in the IFS configured to route a flow of cooling air from a cooling flow channel in the IFS to a cavity formed by a seal standoff, in accordance with various embodiments;

FIG. 10A and FIG. 10B illustrate a cross section view and a partial cross section side view, respectively, of a seal arrangement with the seal retainer coupled directly to the IFS, in accordance with various embodiments; and FIG. 11 illustrates a cross section view of a seal arrangement with outlet apertures directing a flow of cooling air towards components of the seal arrangement, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading and/or crosshatching lines may be used throughout the figures to denote different parts, but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Seal assemblies, as described herein, may provide cooling to a seal to prevent the seal from failing due to thermal loading.

Figure 2:
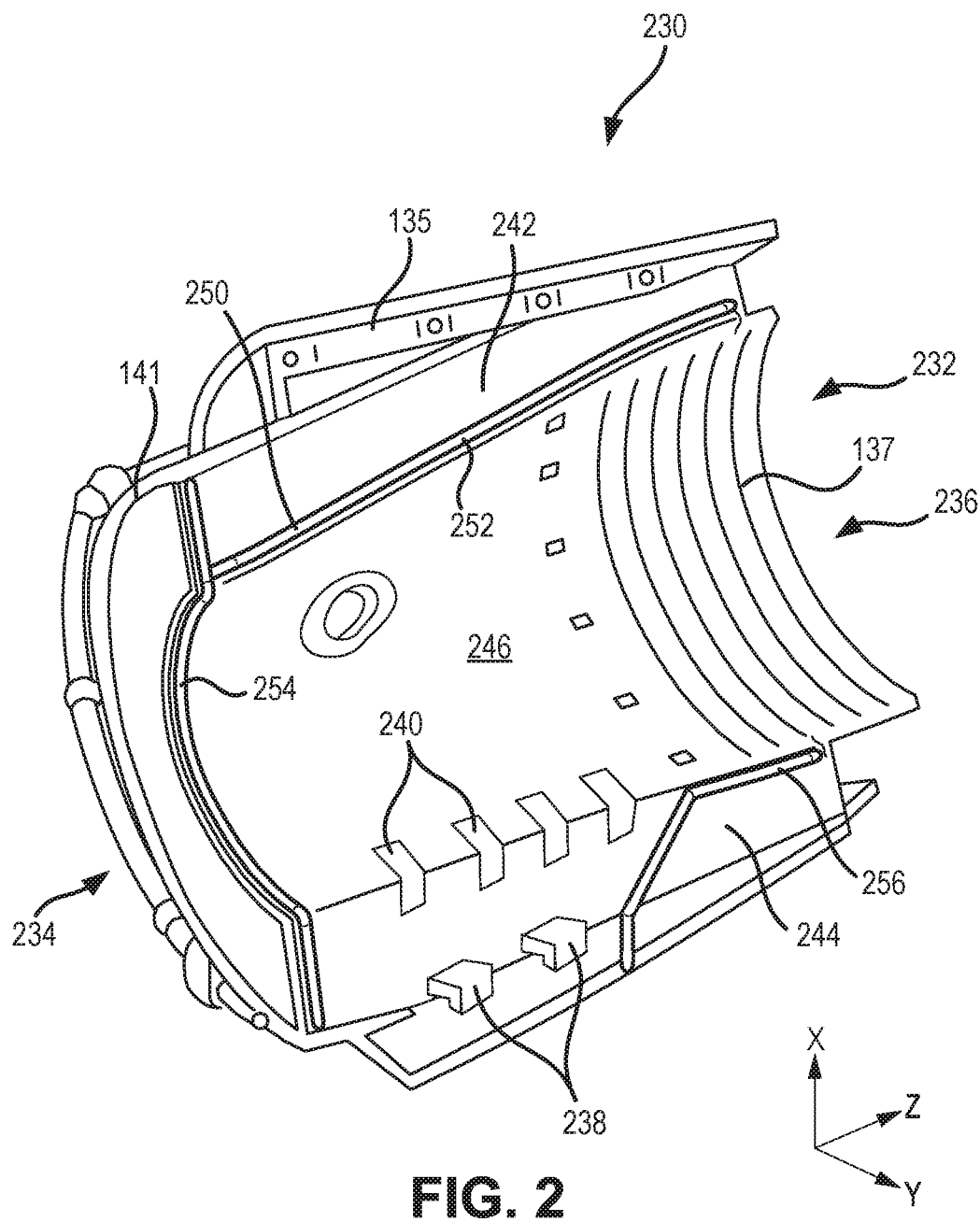
FIG. 2 illustrates a perspective inside view of an IFS with an IFS seal, in accordance with various embodiments.

With respect to FIG. 3 through FIG. 6B, elements with like element numbering, as depicted in FIG. 2, are intended to be the same and will not necessarily be repeated for the sake of clarity. With respect to FIG. 5A through FIG. 6B, elements with like element numbering, as depicted in FIG. 4A, are intended to be the same and will not necessarily be repeated for the sake of clarity. With respect to FIG. 10A through FIG. 11, elements with like element numbering, as depicted in FIG. 4A, are intended to be the same and will not necessarily be repeated for the sake of clarity. Xyz-axes are provided in the figures described herein for ease of illustration.

Figure 1A:
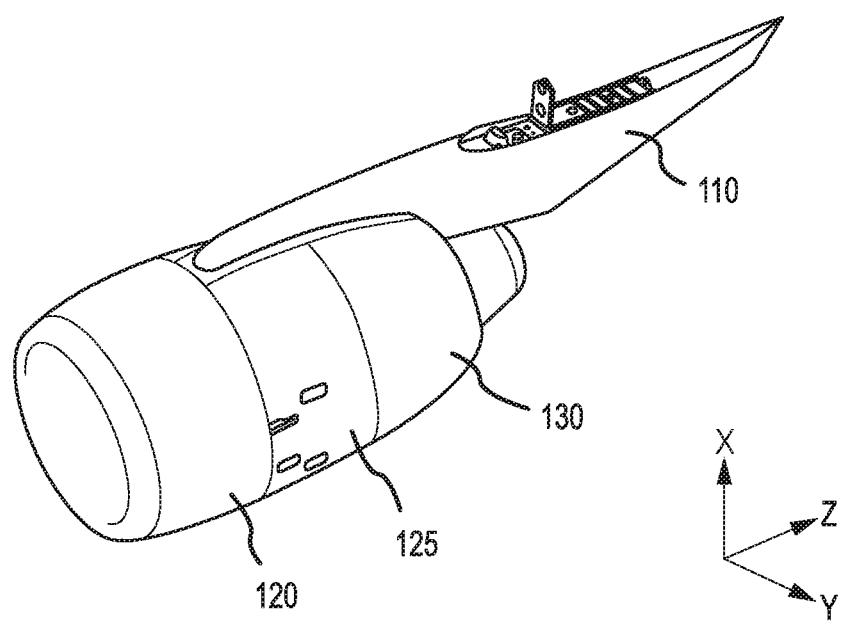
FIG. 1A illustrates a perspective view of a propulsion system and its elements, in accordance with various embodiments.
Figure 1B:
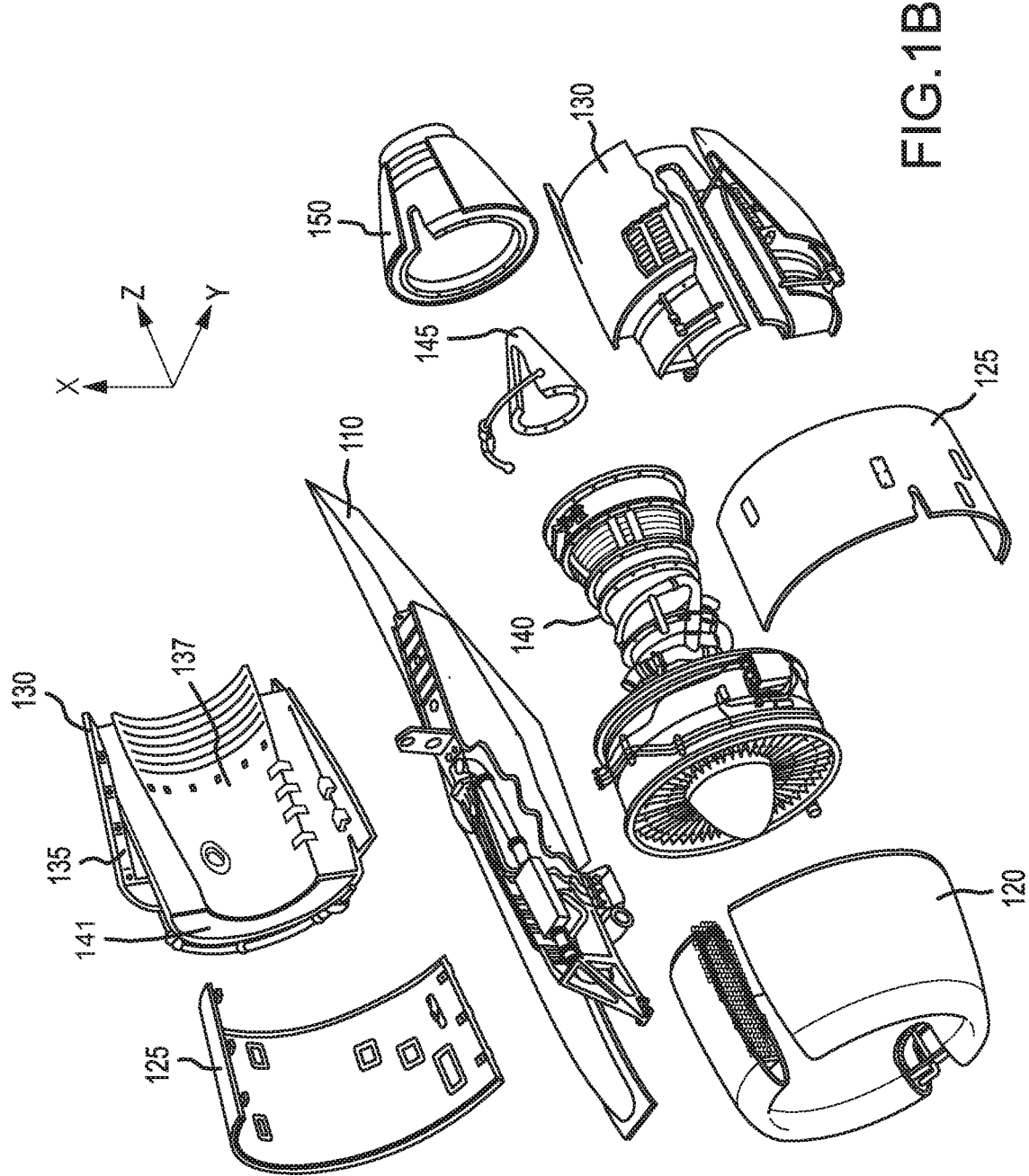
FIG. 1B illustrates an exploded view of the propulsion system and its elements of FIG. 1A, in accordance with various embodiments.

With reference to FIGS. 1A and 1B, a turbofan propulsion system for a commercial jetliner may include an engine 140, pylon 110, and nacelle package. The typical nacelle package, or more simply a nacelle, may comprise an inlet 120, a fan cowl 125, a thrust reverser 130, and an exhaust system including an exhaust cone 145, and exhaust nozzle 150. The nacelle surrounds the engine providing smooth aerodynamic surfaces for airflow around and into the engine. The nacelle also helps define a bypass air duct through the propulsion system.

A fan draws and directs a flow of air into and through the propulsion system. After the fan, the air is divided into two principal flowpaths, one flowpath through the engine core, and another flowpath through a bypass air duct. The engine core flowpath is directed into the engine core and initially passes through a compressor that increases the air flow pressure, and then through a combustor where the air is mixed with fuel and ignited. The combustion of the fuel and air mixture causes a series of turbine blades at the rear of the engine core to rotate, and to drive the engine's rotor and fan. The high-pressure exhaust gases from the combustion of the fuel and air mixture are thereafter directed through an exhaust nozzle at the rear of the engine for thrust.

The bypass air flowpath includes air that is directed around the engine core in a duct or ducts defined by the nacelle. The bypass air exits the duct at a nozzle at the aft end of the nacelle for thrust. In turbofan engines, the bypass flow typically provides a large percentage of the thrust for an aircraft. The bypass air ducts in the nacelle may be C-shaped, and may be principally defined by the exterior surface of the inner fixed structure (IFS) 137 and the inside surface of the outer sleeve 141. If the nacelle includes a typical thrust reverser, the thrust reverser blocks bypass air in the bypass air duct from reaching the nozzle, and instead redirects the bypass air to exit the duct in a forward direction of the aircraft to generate reverse thrust.

The engine 140 may be mounted to pylon 110 in two places. One of these at the aft end of the pylon 110, over the engine turbine case, and in one of two places at the forward end of pylon 110; the engine core (core mount) or the engine fan case (fan mount). Pylon 110 transmits structural loads (including thrust) between engine 140 and a wing.

The thrust reverser 130 may comprise two halves generally configured to surround the engine core. The thrust reverser 130 may be hinged to the pylon 110 via one or more hinges. The thrust reverser 130 comprises an IFS 137 and an outer sleeve 141. The IFS generally surrounds the engine core. As used herein, the outer sleeve 141, though it may have any shape, may generally be a C shaped structure. An exterior surface of the outer sleeve is external to the nacelle. An interior surface of the outer sleeve 141, along with the IFS 137, partially defines a cold flow path of the propulsion system of the aircraft. The IFS 137 and the outer sleeve 141 are typically coupled together and attached to the pylon 110 via a hinge beam 135. As used herein, the IFS 137 is generally referred to as an IFS; however it should be appreciated that a first IFS half may be configured to partially surround an engine core and a second IFS half may be configured to substantially partially surround the remaining engine core.

With reference to FIG. 2, thrust reverser half 230 which exposes a first IFS half 232 of an IFS formed in two "clam-shell" halves, only one clam-shell half being shown, is illustrated, in accordance with various embodiments. It is understood that the unseen second section is substantially a mirror image of first IFS half 232. The IFS section has a forward end 234 and an aft end 236. The IFS halves may be connected together by latches 238 at the bottom and hinged to the pylon 110 (see FIG. 1A through FIG. 2B) at the top. Bumpers 240 may provide a structural bridge between the gaps that separates the two IFS halves. The structural bridge may provide a hoop load path to resist the crushing pressure of the fan air stream upon the barrel sections and bifurcations.

The IFS illustrated in FIG. 2 may encase portions of the engine assembly located between the engine fan case and the nozzle. The IFS may be configured to create an aerodynamically smooth path for air, and a fire and heat boundary by enclosing portions of the engine assembly.

In various embodiments, IFS 137 may comprise a metal or metal alloy including aluminum, nickel, and alloys thereof. IFS 137 may comprise titanium, or an alloy thereof. In various embodiments, IFS 137 may comprise a composite material. The IFS 137 may be a blanketless IFS, in which a thermal blanket is not coupled to the IFS 137. Stated differently, the inner skin of IFS 137 may be directly exposed to thermal loads from engine 140.

In various embodiments, the first IFS half 232 may have an upper bifurcation wall portion 242, a lower bifurcation wall portion 244 and inner barrel portion 246 formed between the two wall portions 242, 244.

In various embodiments, a seal 250 may be coupled to first IFS half 232. Seal 250 may comprise an upper bifurcation seal 252 and a forward edge seal 254. Upper bifurcation seal 252 may extend over first IFS half 232 in close proximity to the joint between upper bifurcation wall portion 242 and inner barrel portion 246. Forward edge seal 254 may extend along the forward end 234 of first IFS half 232. Seal 250 may further include a lower bifurcation seal 256. Seal 250 may seal the engine core to shield various components of the nacelle assembly from heat produced by the engine during and after engine operation. Seal 250 may comprise a fire seal in that seal 250 may be resistant to fire.

Figure 3:
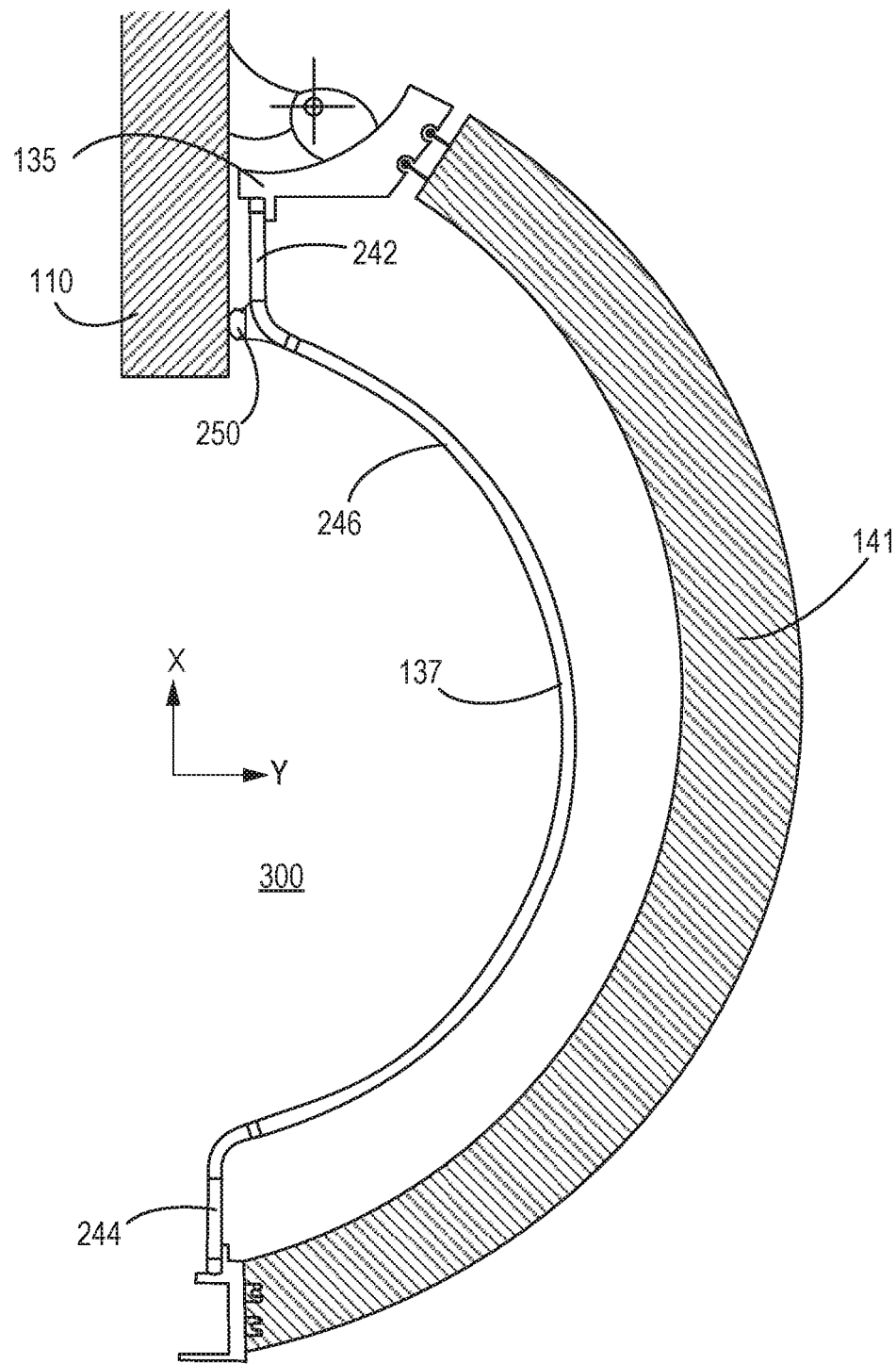
FIG. 3 illustrates a cross-section view of an inner fixed structure (IFS), and an outer sleeve hingeably coupled to a pylon via a hinge beam, in accordance with various embodiments.

With reference to FIG. 3, IFS 137 and outer sleeve shape, and the manner in which they may be attached to pylon 110, is illustrated, in accordance with various embodiments. The IFS 137 may be attached to a hinge beam 135. The hinge beam 135 may form half of a hinge joint with structure attached to the pylon 110. The outer sleeve 141 may also be mounted to the hinge beam 135. For example, the hinge beam may include a pair of tracks that mount the outer sleeve 141 so that the outer sleeve can slide axially aft during thrust reverser deployment. In various embodiments, seal 250 may make contact with pylon 110 and form a seal between pylon 110 and IFS 137. IFS 137 may at least partially define a core engine compartment 300.

Figure 4B:
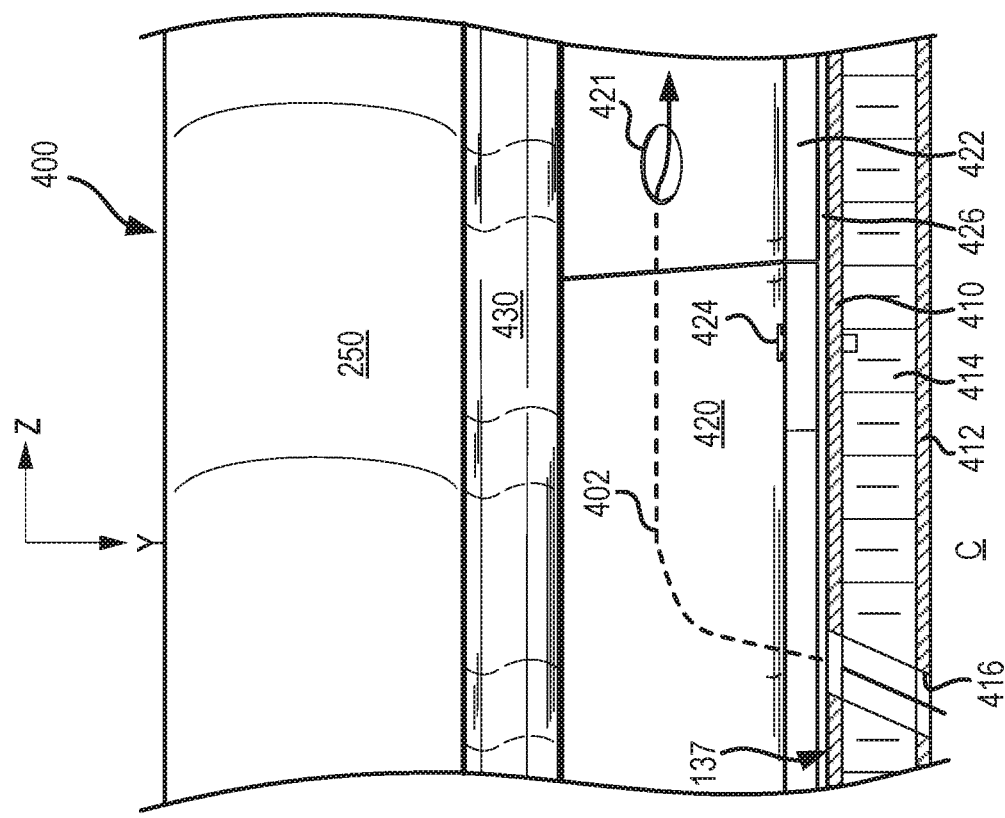
FIG. 4A and FIG. 4B illustrate a cross section view and a partial cross section side view, respectively, of a seal arrangement configured to receive a flow of cooling air in a cavity formed by a seal standoff, in accordance with various embodiments.
Figure 4A:
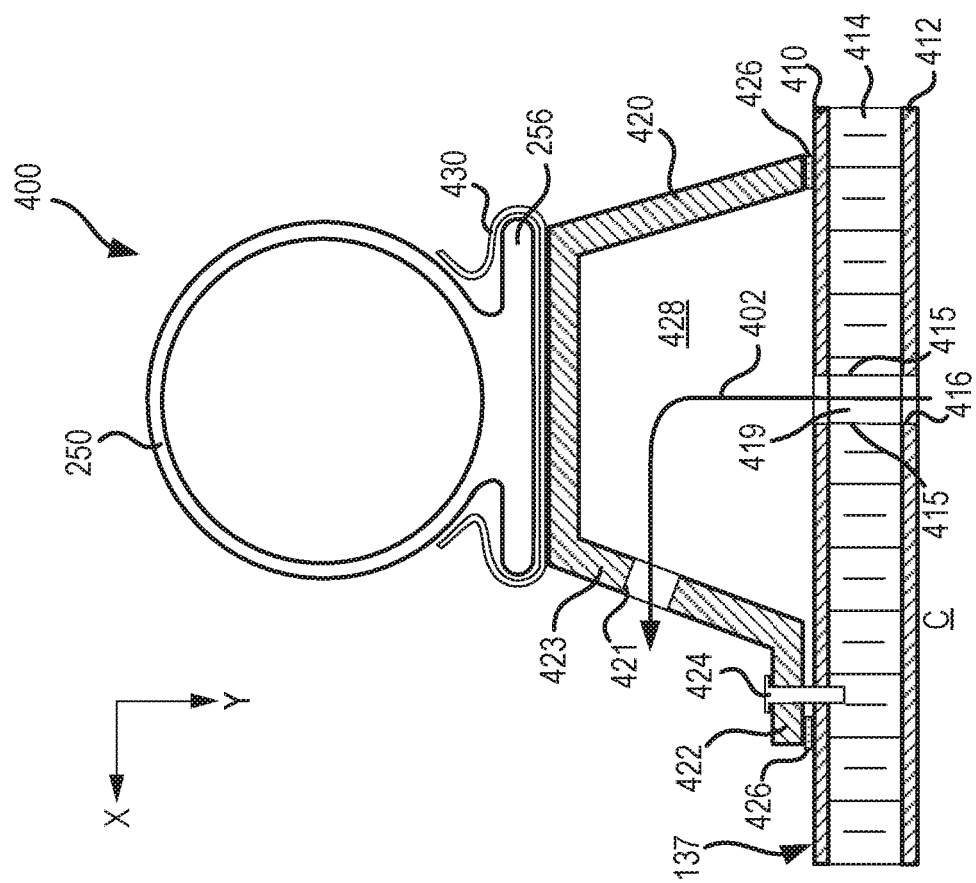

With reference to FIG. 4A and FIG. 4B, a seal arrangement 400 is illustrated, in accordance with various embodiments. Seal arrangement 400 may include seal standoff 420, seal retainer 430, and seal 250. Seal retainer 430 may comprise a sheet of metal shaped to partially house and retain seal 250 with respect to seal standoff 420. Seal retainer 430 may house base portion 256 of seal 250. Seal retainer 430 may comprise a metal or metal alloy such as steel, stainless steel, nickel alloy, or any other suitable high temperature metal or metal alloy. Seal retainer 430 may be coupled to seal standoff 420. Seal standoff 420 may be coupled to IFS 137. Seal standoff 420 may comprise a "U" shape as illustrated in FIG. 4A. Seal standoff 420 may form a cavity 428 defined by seal standoff 420 and IFS 137. Seal standoff 420 may be configured to physically separate seal 250 and IFS 137. Seal standoff 420 may comprise a tab 422 extending from seal standoff 420. A fastener 424 may fasten tab 422 to IFS 137. In this regard, fastener 424 may extend through tab 422 and into IFS 137. Fastener 424 may comprise a rivet, a screw, or the like. A sealant 426 may be disposed between seal standoff 420 and IFS 137. Sealant 426 may prevent fluid from escaping from cavity 428 between seal standoff 420 and IFS 137.

In various embodiments, IFS 137 may comprise an inner skin 410, and outer skin 412, and a cellular core 414. Cellular core 414 may comprise core cells defined by cell walls. For example, FIG. 4A shows cell walls 415 defining a cell, or cooling flow channel 419, through which cooling air 402 may flow. These core cells may be disposed within IFS 137 in various orientations, shapes, and sizes to direct the flow of cooling air 402. For example, FIG. 5A shows cell walls 515 defining a cell corresponding to the maximum width (as measured in the x-direction) of seal standoff 420 to define a cooling air flow path beneath seal standoff 420.

In various embodiments, seal 250 may be hollow. Seal 250 may comprise a fiber reinforced polymeric material. Seal 250 may be capable of withstanding temperatures of up to 350° F. (121.1° C.). An engine operating within engine core compartment 300 may be capable of heating IFS 137 above 350° F. (121.1° C.). Thus, thermally isolating and cooling seal 250 via cooling air 402 may prevent seal 250 from overheating.

Seal arrangement 400 may be configured to provide cooling to seal 250 to prevent seal 250 from heating above a threshold temperature. Cooling air 402 may be supplied from a bypass flow path C located radially outward from IFS 137, with respect to a centerline axis of an engine located within IFS 137. Inlet aperture 416 may be disposed through IFS 137. Inlet aperture 416 may be partially defined by cell walls 415. Inlet aperture 416 may extend between cavity 428 and bypass flow path C. In various embodiments, inlet aperture 416 may be partially angled in the direction of air flowing through core flow path C to facilitate entry of air into inlet aperture 416. Cooling air 402 may enter cavity 428 via inlet aperture 416. Cooling air 402 may remove heat from IFS 137. Cooling air 402 may remove heat from seal standoff 420. Cooling air 402 may provide convection cooling to seal standoff 420. Cooling air 402 may remove heat from seal retainer 430 and seal 250. Seal standoff may comprise an outlet aperture 421. Cooling air 402 may flow along cavity 428 and exit cavity 428 through outlet aperture 421. Outlet aperture 421 may be disposed in sidewall 423 of seal standoff 420.

With reference to FIG. 5A and FIG. 5B, a seal arrangement 500 is illustrated, in accordance with various embodiments. Seal arrangement 500 may be similar to seal arrangement 400, with momentary reference to FIG. 4A, except that cooling air 502 is directed through cellular core 414 of IFS 137, between inner skin 410 and outer skin 412, instead of through cavity 428 of seal standoff 420. In this regard, inlet aperture 516 may be disposed in outer skin 412 of IFS 137 and outlet aperture 518 may be disposed in inner skin 410 of IFS 137. Outlet aperture 518 may be disposed axially aft (i.e., in the positive z-direction) of inlet aperture 516. Cell walls 515 may be located such that a cooling flow channel 519 is formed in cellular core 414. Inner skin 410, outer skin 412, and cellular core 414 may define cooling flow channel 519. Cooling flow channel 519 may be located directly beneath (in the y-direction) seal standoff 420. Cooling air 502 may provide convective cooling to IFS 137. IFS 137 may provide conductive cooling to seal standoff 420 in response to cooling air 502 convectively cooling IFS 137. In this regard, seal standoff 420 may be in thermal communication with cooling flow channel 519.

With reference to FIG. 6A and FIG. 6B, a seal arrangement 600 is illustrated, in accordance with various embodiments. Seal arrangement 600 may be similar to seal arrangement 400, with momentary reference to FIG. 4A. Cooling air 602 may enter IFS 137 via inlet aperture 516 into cooling flow channel 519. Cooling air 602 may enter cavity 428 from cooling flow channel 519 via a plurality of apertures 660. Plurality of apertures 660 may be disposed across the width (in the x-direction) of cavity 428, as illustrated in FIG. 6A. Plurality of apertures 660 may be disposed along the length (in the z-direction) of cavity 428, as illustrated in FIG. 6B. It should be appreciated that the size, length, and cross-section area of the plurality of aperture 660 may be sized, in accordance with various embodiments, to achieve desired characteristics of the flow of cooling air 602. Such characteristics may include mass flow rate, pressure ratio, etc. In various embodiments, the cross-section area of each aperture included in the plurality of apertures 660 may comprise a cross-section area which is less than the cross-section area of inlet aperture 516. Cooling air 602 may exit cavity 428 via outlet aperture 421.

Seal arrangement 600 may be similar to seal arrangement 500, with momentary reference to FIG. 5A. Cooling air 602 may enter cellular core 414, flow through cooling flow channel 519, and exit cellular core 414 via outlet aperture 518. Cooling air 602 may exit outlet aperture 518 into core compartment 300, with momentary reference to FIG. 3.

Figure 7:
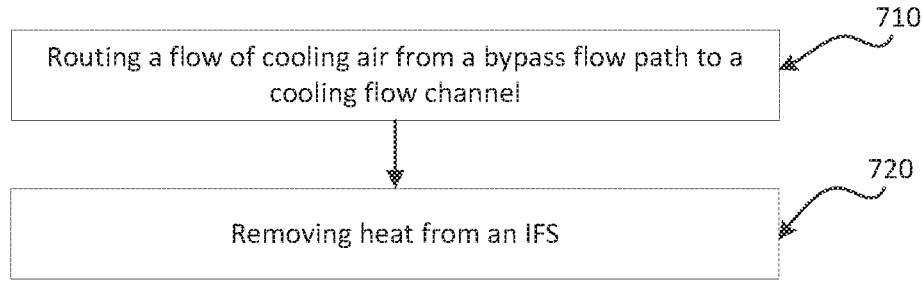
FIGS. 7, 8 and 9 illustrate methods for cooling an inner fixed structure seal, in accordance with various embodiments.

With reference to FIG. 7, a method 700 for cooling an IFS seal is illustrated, in accordance with various embodiments. Method 700 includes routing a flow of cooling air from a bypass flow path to a cooling flow channel (step 710). Method 700 includes removing heat from an IFS (step 720).

With combined reference to FIG. 4A, FIG. 4B, and FIG. 7, step 710 may include routing flow of cooling air 402 from bypass flow path C to cooling flow channel 419. Step 710 may include routing the flow of cooling air 402 from bypass flow path C to cavity 428. Step 720 may include removing, by the flow of cooling air 402, heat from IFS 137. The flow of cooling air 402 may be routed, by outlet aperture 421, from cavity 428 to a core engine compartment 300, with momentary reference to FIG. 3. Heat may be transferred from seal retainer 430 to the seal standoff 420 and to cooling air 402. For example, seal 250 and/or seal retainer 430 may receive heat from an engine which may be transferred conductively to seal standoff 420.

Figure 8:
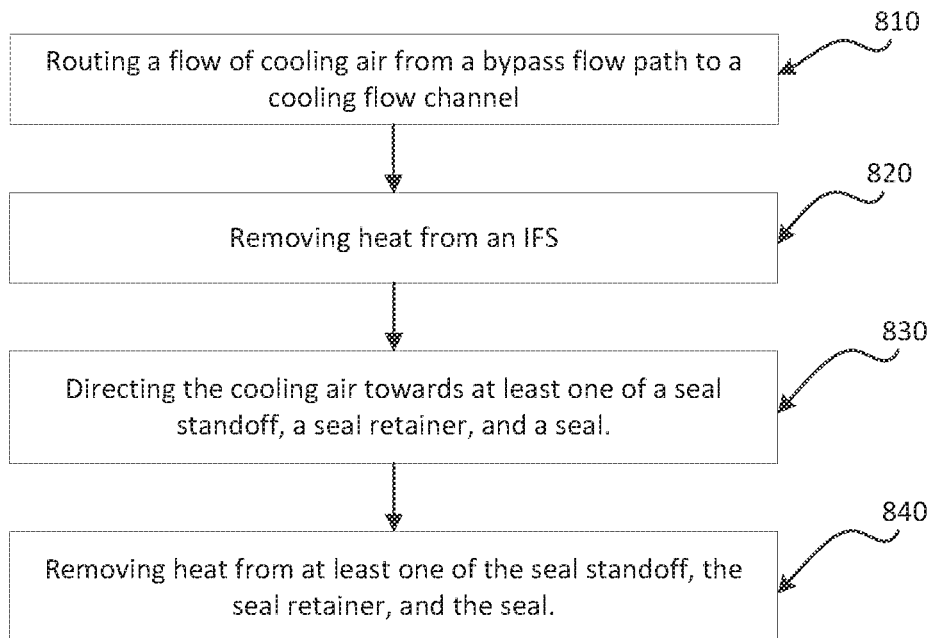

With reference to FIG. 8, a method 800 for cooling an IFS seal is illustrated, in accordance with various embodiments. Method 800 may include routing a flow of cooling air from a bypass flow path to a cooling flow channel (step 810). Method 800 may include removing heat from an IFS (step 820). Method 800 may include directing the cooling air towards at least one of a seal standoff, a seal retainer, and a seal (step 830). Method 800 may include removing heat from at least one of a seal standoff, a seal retainer, and a seal (step 840).

With combined reference to FIG. 11 and FIG. 8, step 810 may include routing flow of cooling air 502 from bypass flow path C to cooling flow channel 519 defined by inner skin 410 of IFS 137, outer skin 412 of IFS 137, and cellular core 414 of IFS 137. Step 820 may include removing, by the flow of cooling air 502, heat from IFS 137. Step 830 may include directing flow of cooling air 502 towards at least one of seal standoff 420, seal retainer 430, and seal 250. Step 840 may include removing heat, via flow of cooling air 502, from at least one of seal standoff 420, seal retainer 430, and seal 250. Heat may be transferred between seal 250, seal retainer 430, seal standoff 420, and IFS 137 conductively. Heat may be removed from seal 250, seal retainer 430, seal standoff 420, and/or IFS 137 convectively.

Figure 9:
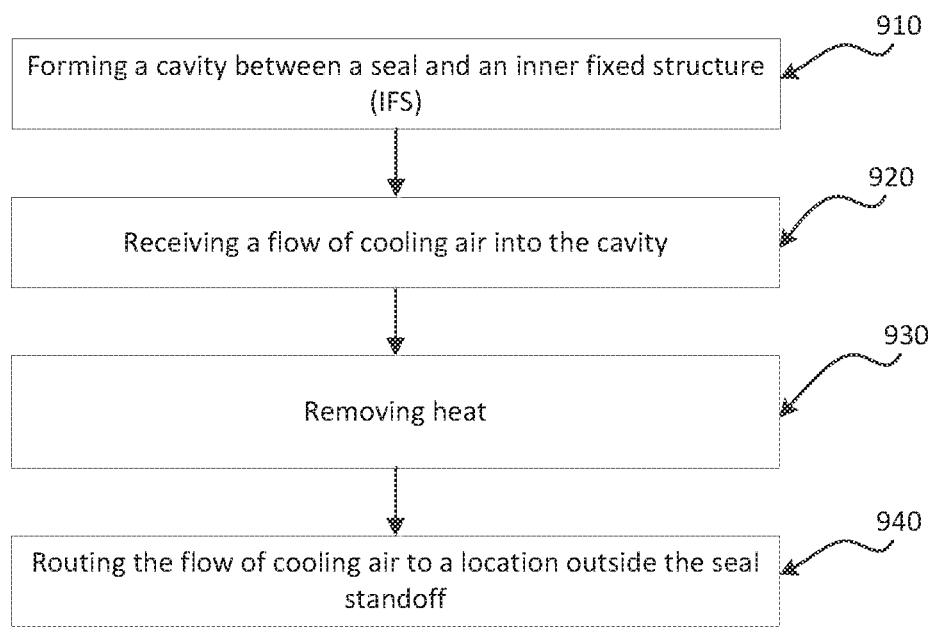

With reference to FIG. 9, a method 900 for cooling an IFS seal is illustrated, in accordance with various embodiments.

Method 900 may include forming a cavity between a seal and an inner fixed structure (step 910). Method 900 may include receiving a flow of cooling air into the cavity (step 920). Method 900 may include removing heat from the seal (step 930). Method 900 may include routing the flow of cooling air to a location outside the seal standoff (step 940).

With combined reference to FIG. 6A, FIG. 6B, and FIG. 9, step 910 may include forming, by seal standoff 420, cavity 428 between seal 250 and IFS 137. Step 920 may include receiving, by cavity 428, a flow of cooling air 602. Step 930 may include removing, by the flow of cooling air 602, heat from seal 250. Step 940 may include routing, by outlet aperture 421, the flow of cooling air 602 from cavity 428 to a location exterior to the seal standoff 420, for example to core engine compartment 300, with momentary reference to FIG. 3. However, cooling air 602 may be routed to any suitable location.

With reference to FIG. 10A and FIG. 10B, seal arrangement 10 is illustrated, in accordance with various embodiments. Seal arrangement 10 may be similar to seal arrangement 500, except that seal arrangement 10 omits seal standoff 420, with momentary reference to FIG. 5A. In this regard, seal retainer 430 may be coupled directly to inner skin 410 of IFS 137. Seal retainer 430 may be coupled directly over cooling flow channel 519. In this regard, heat from IFS 137 and/or seal retainer 430 may be transferred to cooling air 502 to prevent seal 250 from overheating. Retainer 430 may be coupled to inner skin 410 via fastener 424.

With reference to FIG. 11, seal arrangement 11 is illustrated, in accordance with various embodiments. Seal arrangement 11 may be similar to seal arrangement 500, with momentary reference to FIG. 5A. Outlet aperture 18 may be disposed in inner skin 410 and outlet aperture 19 may be disposed in inner skin 410. Outlet aperture 18 may direct cooling air 502 towards seal 250, seal retainer 430, and/or seal standoff 420. In this regard, cooling air 502 may impinge on seal 250, seal retainer 430, and/or seal standoff 420 to provide convective cooling. Similarly, outlet aperture 19 may direct cooling air 502 towards seal 250, seal retainer 430, and/or seal standoff 420.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inner fixed structure (IFS) seal arrangement comprising:
   an IFS comprising an inner skin, and outer skin, and a cellular core located between the inner skin and the outer skin;
   an IFS seal;
   a seal retainer configured to retain the IFS seal; and
   a cooling flow channel disposed between the outer skin and the seal retainer,
   wherein the inner skin, the outer skin, and the cellular core define the cooling flow channel configured to receive a flow of cooling air from a bypass flow path via an inlet aperture disposed in the outer skin,
   the IFS comprises an outlet aperture disposed in the inner skin for routing the flow of cooling air out of the cooling flow channel, and
   the outlet aperture is configured to direct the flow of cooling air towards at least one of the seal retainer or the IFS seal.

2. The IFS seal arrangement of claim 1, wherein the IFS seal comprises an upper bifurcation seal configured to form a seal between a pylon and the IFS.

3. The IFS seal arrangement of claim 2, wherein the seal comprises a fiber reinforced polymeric material.

4. The IFS seal arrangement of claim 1, further comprising a seal standoff configured to be coupled to the IFS.

5. The IFS seal arrangement of claim 4, wherein the seal retainer is configured to be coupled to the seal standoff.

6. The IFS seal arrangement of claim 5, wherein the seal standoff is configured to form a cavity between the seal standoff and the IFS and at least partially defines an outlet aperture whereby a flow of cooling air may exit the cavity.

7. The IFS seal arrangement of claim 6, wherein
   the seal standoff is located between the IFS and the seal retainer, and
   the seal retainer is located between the IFS seal and the seal standoff.

8. The IFS seal arrangement of claim 7, wherein the outlet aperture is disposed in a sidewall of the seal standoff.

9. The IFS seal arrangement of claim 8, wherein the seal standoff is configured to be located over an inlet aperture disposed in the IFS.

10. The IFS seal arrangement of claim 9, wherein the cavity is configured to receive the flow of cooling air from a bypass flow path.

11. The IFS seal arrangement of claim 10, wherein the seal standoff is configured to transfer heat from the seal standoff to the flow of cooling air.

12. The IFS seal arrangement of claim 1, wherein the flow of cooling air is configured to cool the IFS.

13. The IFS seal arrangement of claim 1, wherein the outlet aperture is configured to direct the flow of cooling air to impinge on at least one of the seal retainer or the IFS seal.

14. An inner fixed structure (IFS) seal arrangement comprising:
   an IFS comprising an inner skin, and outer skin, and a cellular core located between the inner skin and the outer skin;
   a seal standoff configured to be coupled to the IFS;
   a seal retainer configured to be coupled to the seal standoff;
   an IFS seal configured to be coupled to the seal retainer;
   a cooling flow channel disposed in the IFS defined by the inner skin, the outer skin, and the cellular core;
   an inlet aperture disposed in the outer skin;
   a plurality of apertures disposed in the outer skin;
   a cavity defined by the IFS and the seal standoff; and
   an outlet aperture at least partially defined by the seal standoff for routing the flow of cooling air out of the cavity,
   wherein the cooling flow channel is configured to receive a flow of cooling air from a bypass flow path via the inlet aperture, and
   the cavity is configured to receive the flow of air via the plurality of apertures.

15. The IFS seal arrangement of claim 14, wherein
   the seal standoff is located between the IFS and the seal retainer, and
   the seal retainer is located between the IFS seal and the seal standoff.

16. The IFS seal arrangement of claim 15, further comprising an outlet aperture disposed in the outer skin for routing the flow of cooling air out of the cooling flow channel.

17. A method of cooling a seal, comprising:
   routing a flow of cooling air from a bypass flow path to a cooling flow channel at least partially defined by a seal standoff;
   removing heat from an inner fixed structure (IFS); and
   routing the flow of cooling air from the cooling flow channel out the seal standoff via an outlet aperture at least partially defined by the seal standoff,
   wherein the IFS comprises an inner skin, and outer skin, and a cellular core located between the inner skin and the outer skin,
   and the cooling flow channel is disposed between the outer skin and a seal retainer,
   the seal retainer configured to retain the seal.

* * * * *